US009045574B2

(12) United States Patent
Ikeda et al.

(10) Patent No.: US 9,045,574 B2
(45) Date of Patent: Jun. 2, 2015

(54) VISCOSITY MODIFIER FOR LUBRICATING OILS, ADDITIVE COMPOSITION FOR LUBRICATING OILS, AND LUBRICATING OIL COMPOSITION

(75) Inventors: Satoshi Ikeda, Chiba (JP); Nozomi Kamiya, Ichihara (JP); Hiroshi Hoya, Amaryllis Ville (SG); Jumpei Tanaka, Hatsukaichi (JP); Chor Huang, Avon, OH (US)

(73) Assignees: MITSUI CHEMICALS, INC., Tokyo (JP); THE LUBRIZOL CORPORATION, Wickliffe, OH (US)

( * ) Notice: Subject to any disclaimer, the term of this patent is extended or adjusted under 35 U.S.C. 154(b) by 265 days.

(21) Appl. No.: 13/498,324

(22) PCT Filed: Sep. 28, 2009

(86) PCT No.: PCT/US2009/058526
§ 371 (c)(1),
(2), (4) Date: Mar. 26, 2012

(87) PCT Pub. No.: WO2011/037585
PCT Pub. Date: Mar. 31, 2011

(65) Prior Publication Data
US 2012/0190601 A1 Jul. 26, 2012

(51) Int. Cl.
C07C 7/20 (2006.01)
C07C 9/00 (2006.01)
(Continued)

(52) U.S. Cl.
CPC ............. *C08F 210/16* (2013.01); *C08F 210/06* (2013.01); *C10M 143/00* (2013.01); *C10M 143/04* (2013.01); *C10M 143/06* (2013.01);
(Continued)

(58) Field of Classification Search
CPC ................ C10M 2207/125; C10M 2207/129; C10M 2203/02; C10N 2210/01; C07C 2531/24
USPC .......................................... 508/459; 585/1, 16
See application file for complete search history.

(56) References Cited

U.S. PATENT DOCUMENTS 2,501,731 A 3/1950 Mertes
2,616,905 A 11/1952 Asseff
(Continued)

FOREIGN PATENT DOCUMENTS

EP 1 300 458 B1 4/2005
GB 2 058 094 A 4/1981
(Continued)

OTHER PUBLICATIONS

Chinese Office Action issued in connection with the corresponding application No. 201080043005.2, dated Sep. 3, 2013.
(Continued)

*Primary Examiner* — Vishal Vasisth
(74) *Attorney, Agent, or Firm* — Foley & Lardner LLP

(57) ABSTRACT

It is an object to provide a lubricating oil composition having low-temperature properties and fuel efficiency at high temperatures which are superior to those of conventional lubricating oil compositions, and to provide a viscosity modifier for lubricating oils and an additive composition for lubricating oils which are used for obtaining said composition. The viscosity modifier for lubricating oils of the present invention comprises a propylene copolymer (A) which has a density of 875 kg/m3 or less and which comprises 60 mole % or more of structural unit derived from propylene.

8 Claims, 2 Drawing Sheets

(51) Int. Cl.
*C07C 11/00* (2006.01)
*C10M 145/26* (2006.01)
*C08F 210/16* (2006.01)
*C10M 143/00* (2006.01)
*C10M 143/04* (2006.01)
*C10M 143/06* (2006.01)
*C10M 143/08* (2006.01)
*C08F 210/06* (2006.01)

(52) U.S. Cl.
CPC ..... *C10M143/08* (2013.01); *C10M 2203/1025* (2013.01); *C10M 2205/022* (2013.01); *C10M 2205/024* (2013.01); *C10M 2205/028* (2013.01); *C10M 2205/0285* (2013.01); *C10M 2207/026* (2013.01); *C10M 2209/084* (2013.01); *C10M 2215/064* (2013.01); *C10M 2219/022* (2013.01); *C10M 2223/045* (2013.01); *C10N 2210/01* (2013.01); *C10N 2210/02* (2013.01); *C10N 2220/021* (2013.01); *C10N 2220/023* (2013.01); *C10N 2220/032* (2013.01); *C10N 2230/02* (2013.01); *C10N 2230/08* (2013.01); *C10N 2230/54* (2013.01); *C10N 2230/68* (2013.01); *C10N 2230/70* (2013.01); *C10N 2240/04* (2013.01); *C10N 2240/042* (2013.01); *C10N 2240/044* (2013.01); *C10N 2240/10* (2013.01); *C10N 2240/102* (2013.01); *C10N 2240/105* (2013.01); *C10N 2250/10* (2013.01); *C10N 2270/02* (2013.01)

(56) References Cited

U.S. PATENT DOCUMENTS

| | | | |
|---|---|---|---|
| 2,616,911 | A | 11/1952 | Asseff |
| 2,616,925 | A | 11/1952 | Asseff |
| 2,777,874 | A | 1/1957 | Asseff |
| 3,172,892 | A | 3/1965 | Le Suer |
| 3,256,186 | A | 6/1966 | Greenwalkd |
| 3,318,809 | A | 5/1967 | Bray |
| 3,320,162 | A | 5/1967 | Axe |
| 3,365,396 | A | 1/1968 | Schilcht |
| 3,381,022 | A | 4/1968 | Le Suer |
| 3,384,585 | A | 5/1968 | Gragson |
| 3,488,284 | A | 1/1970 | Lesuer |
| 3,629,109 | A | 12/1971 | Gergel et al. |
| 3,634,515 | A | 1/1972 | Piasek |
| 4,234,435 | A | 11/1980 | Meinhardt et al. |
| 4,285,822 | A | 8/1981 | DeVries et al. |
| 4,654,403 | A | 3/1987 | Tipton |
| 6,200,936 | B1 | 3/2001 | Moreton |
| 6,310,009 | B1 | 10/2001 | Kocsis et al. |
| 6,399,549 | B1 | 6/2002 | Taylor et al. |
| 6,525,007 | B2 | 2/2003 | Okada et al. |
| 6,559,105 | B2 | 5/2003 | Abraham et al. |
| 6,583,093 | B2 | 6/2003 | Taylor et al. |
| 7,402,638 | B2 | 7/2008 | Matsumura et al. |
| 7,432,336 | B2 | 10/2008 | Brant |
| 7,488,789 | B2 | 2/2009 | Ikenaga et al. |
| 7,776,805 | B2 | 8/2010 | Matsuda et al. |
| 7,879,960 | B2 | 2/2011 | Funaya et al. |
| 7,915,358 | B2 | 3/2011 | Ikeda et al. |
| 2006/0247381 | A1 | 11/2006 | Mori et al. |
| 2007/0249508 | A1 | 10/2007 | Matsuda et al. |
| 2009/0192061 | A1 | 7/2009 | Boegner et al. |
| 2012/0015854 | A1* | 1/2012 | Ravishankar et al. ........ 508/459 |

FOREIGN PATENT DOCUMENTS

| | | |
|---|---|---|
| JP | 2006-523753 A | 10/2006 |
| JP | 2009-029983 | 2/2009 |
| WO | WO-01/56968 A1 | 8/2001 |
| WO | WO-2004/087775 A1 | 10/2004 |
| WO | WO-2004/106430 A1 | 12/2004 |
| WO | WO-2005/019283 A1 | 3/2005 |
| WO | WO-2006/025540 A1 | 3/2006 |
| WO | WO-2008/047878 A1 | 4/2008 |
| WO | WO-2009/101936 A1 | 8/2009 |
| WO | WO 2010/016847 A1 | 2/2010 |

OTHER PUBLICATIONS

Dajun He, "Regeneration of Industrial Waste Oil", China Machine Press, Oct. 2001, p. 85.
Office Action European Application No. 10 760 885.3 dated Jan. 25, 2013.
Gatos, K. et al. "Mechanically and thermally induced chain conformational transformations between helical form I and trans-planar form III in syndiotactic polypropylene using FT-IR and Raman spectroscopic techniques", Polymer, 2004, vol. 45, pp. 4453-4464.
International Search Report in PCT/US2010/050370 dated Jan. 19, 2011.
Stephens, C. H. et al. "Comparison of Propylene/Ethylene Copolymers Prepared with Different Catalysts", Journal of Applied Polymer Science, Apr. 15, 2006, pp. 1651-1658. XP002594075.
Written Opinion and International Search Report in PCT/US2009/58526 dated Nov. 16, 2009.
Japanese Office Action dated Mar. 4, 2014 issued in Japanese Application No. 2012-531098.

* cited by examiner

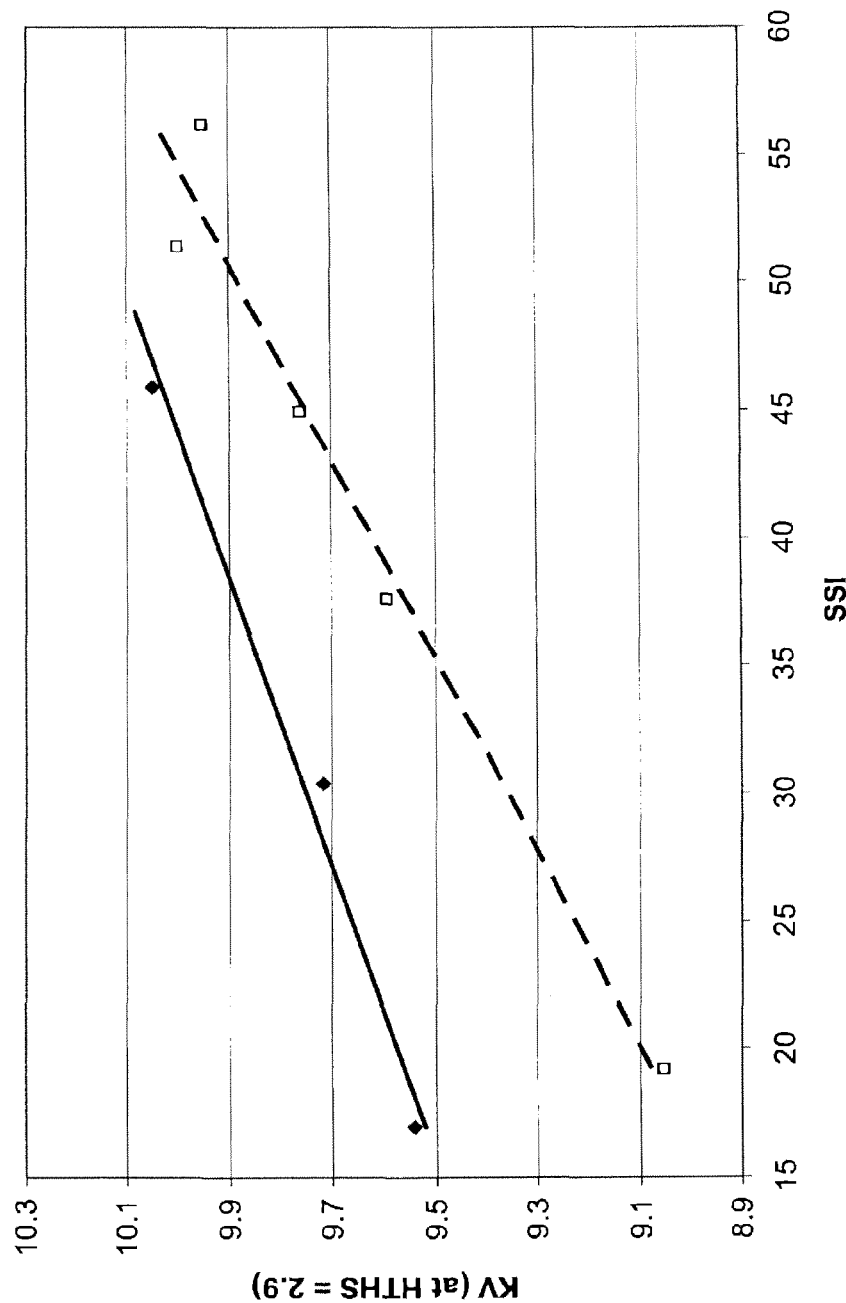

VISCOSITY MODIFIER FOR LUBRICATING OILS, ADDITIVE COMPOSITION FOR LUBRICATING OILS, AND LUBRICATING OIL COMPOSITION

This application is a 371 of PCT/US09/58526, filed Sep. 28, 2009.

TECHNICAL FIELD

The present invention relates to a viscosity modifier for lubricating oils, an additive composition for lubricating oils, and a lubricating oil composition.

BACKGROUND ART

Petroleum products have so-called temperature dependence of viscosity wherein a large variation in viscosity is exhibited with variation in temperature. For example, for lubricating oil compositions used for automobiles or the like, it is preferable that the temperature dependence of viscosity is small. Therefore, in order to decrease the temperature dependence of viscosity, a certain kind of polymer which is soluble in a lubricating oil base is used in lubricating oil as a viscosity modifier.

Ethylene/α-olefin copolymers are widely used as viscosity modifiers for lubricating oils, and various improvements have been made in order to further improve the balance of performances of the lubricating oils (for example, see patent Document 1).

In recent years, in view of the reduction of petroleum resources and environmental problems such as global warming, an improvement of fuel efficiency of automobiles which is aimed at reducing $CO_2$ emissions is required. A significant effect with low cost can be expected from lowering fuel consumption by lubricating oils, as compared to physical modification of the lubricated machinery. Therefore, the requirement for improving fuel efficiency by lubricating oils is growing.

The power loss in an engine or transmission is divided into friction loss at a sliding part and agitation loss due to the viscosity of lubricating oil. In particular, reduction of viscosity resistance is one measure of lowering fuel consumption by engine oils. In recent years, fuel consumption is tested based on performance at low temperatures as well as that at high temperatures, and thus reduction of viscosity resistance in a wide temperature range from low temperature to high temperature is desirable for improving fuel efficiency.

Lowering viscosity is effective for the reduction of viscosity resistance of an engine oil. In particular, at a low temperature, reducing viscosity is effective for the reduction of both friction loss and agitation loss. However, this does not mean that the viscosity should be simply lowered, because abrasion is caused at a sliding part at a high temperature. In other words, it is desired that the viscosity is lowered as much as possible in order to reduce agitation loss at a non-sliding part while a certain minimum required viscosity is ensured to avoid abrasion at a sliding part.

In order to reduce low-temperature viscosity, it is known to use a polymer as described in Patent Document 1, wherein the polymer dissolves in base oil and provides excellent thickening properties at a high temperature, while the solubility of the polymer in oil is decreased at a low temperature, and thereby its effective volume (flow volume) and impact on viscosity are decreased.

Also, a viscosity modifier for lubricating oils comprising an ethylene/α-olefin copolymer containing a structural unit derived from ethylene and a structural unit derived from two or more kinds of α-olefins is known (for example, see Patent Document 2).

Regarding the viscosity modifiers described in Patent Documents 1 and 2, an improvement of fuel efficiency at low temperature is sufficient because the low-temperature viscosity of a lubricating oil composition containing said modifier is decreased. However, there is room for improvement regarding fuel efficiency at high temperatures.

PRIOR ART DOCUMENTS

[Patent Document 1] International Publication WO 00/034420
[Patent Document 2] International Publication WO 06/028169

SUMMARY OF THE INVENTION

Problems to be Solved by the Invention

It is an object of the present invention to provide a viscosity modifier for lubricating oils and an additive composition for lubricating oils, to obtain a lubricating oil composition having good low-temperature properties and good fuel efficiency at a high temperatures, which may be superior to those of conventional lubricating oil compositions. It is another object to provide a lubricating oil composition having excellent low-temperature properties and fuel efficiency at a high temperature.

Means for Solving the Problems

In the above circumstances, the present inventors have intensively investigated and found that using a specific propylene copolymer as a viscosity modifier for lubricating oils gives a lubricating oil composition excellent low-temperature properties and fuel efficiency at high temperatures.

That is, a viscosity modifier for lubricating oils of the present invention comprises a propylene copolymer (A) which has a density of 875 kg/m³ or less and comprises 60 mole % or more of structural units (i.e., monomer units) derived from propylene, with the proviso that the total of all structural units is 100 mole % (calculated on the basis that the total of all monomer units in the polymer is 100 mole %).

In one embodiment, the propylene copolymer (A) exhibits a melting point (Tm 1) of 30° C. to 80° C. when measured by:
(a1) preparing a sheet with a thickness of 2 mm, which sheet is obtained by preheating the propylene copolymer (A) for 5 minutes and pressing the propylene copolymer (A) for 2 minutes using a hot press molding machine set at 190° C., and cooling the pressed propylene copolymer (A) for 4 minutes in a cooling tank set at 20° C.; storing the pressed sheet at 20° C. for 4 weeks; and subsequently observing the pressed sheet in a differential scanning calorimeter (DSC) by cooling the sheet to −20° C., maintaining the sheet at −20° C. for 5 minutes and heating the sheet to 200° C. at a rate of 10° C./min.

In one embodiment, the propylene copolymer (A) exhibits a heat of fusion (ΔH2) of 5 J/g or less when measured by:
(a2) preparing a sheet with a thickness of 2 mm, which sheet is obtained by preheating the propylene copolymer (A) for 5 minutes and pressing the propylene copolymer (A) for 2 minutes using a hot press molding machine set at 190° C., and cooling the pressed propylene copolymer (A) for 4 minutes in a cooling tank set at 20° C.; storing the pressed sheet at 20° C. for 4 weeks; and subsequently observing the pressed sheet in a differential scanning calorimeter (DSC) by cooling the sheet to −20° C., maintaining the sheet at −20° C. for 5 minutes, heating the sheet to 200° C. at a rate of 10° C./min, maintaining the sheet at 200° C. for 5 minutes, cooling the sheet to −100° C. at a rate of 10° C./min, storing the sheet at −100° C. for 5 minutes, and heating the sheet to 200° C. at a rate of 10° C./min, measuring the heat of fusion (ΔH2) on said subsequent heating.

In one embodiment, the propylene copolymer (A) comprises 60 to 90 mole % of structural units derived from propylene and 10 to 40 mole % of structural units derived from at least one kind of olefin selected from ethylene and α-olefins having 4 to 20 carbon atoms with the proviso that the total of all structural units in the polymer is 100 mole %.

In one embodiment, the propylene copolymer (A) comprises 60 to 85 mole % of structural units derived from propylene, 5 to 20 mole % of structural units derived from ethylene and 5 to 30 mole % of structural units derived from α-olefin having 4 to 20 carbon atoms with the proviso that the total of all structural units is 100 mole %. In one embodiment, the α-olefin having 4 to 20 carbon atoms comprises 1-butene.

In one embodiment the density of the propylene copolymer (A) is in the range of 853 to 875 kg/m$^3$.

In one embodiment the weight average molecular weight of the propylene copolymer (A) is 10,000 to 500,000 as measured by a gel permeation chromatography (GPC).

An additive composition for lubricating oils of the present invention may comprise 1 to 50 wt % (weight percent) of the propylene copolymer (A) and 50 to 99 wt % of oil (B) with the proviso that the weight % of said (A) and (B) are calculated based on the total amount of (A) and (B) in the additive composition.

A lubricating oil composition of the present invention may comprise the propylene copolymer (A) and a lubricating oil base (BB), wherein said propylene copolymer (A) is present in an amount of 0.1 to 5 wt % in 100 wt % of the overall lubricating oil composition.

In one embodiment, the lubricating oil composition of the present invention further contains 0.05 to 5 wt % of a pour-point depressant (C) in 100 wt % of the lubricating oil composition.

Effect of the Invention

The lubricating oil composition of the present invention typically provides low-temperature properties and fuel efficiency at high temperatures which are superior to those of conventional lubricating oil compositions.

BRIEF DESCRIPTION OF THE FIGURES

FIG. 2 is a plot of kinematic viscosity at 100° C. as a function of shear stability index for calculated formulations having a constant HTHS of 2.9.

BEST MODE FOR CARRYING OUT THE INVENTION

Figure 1:
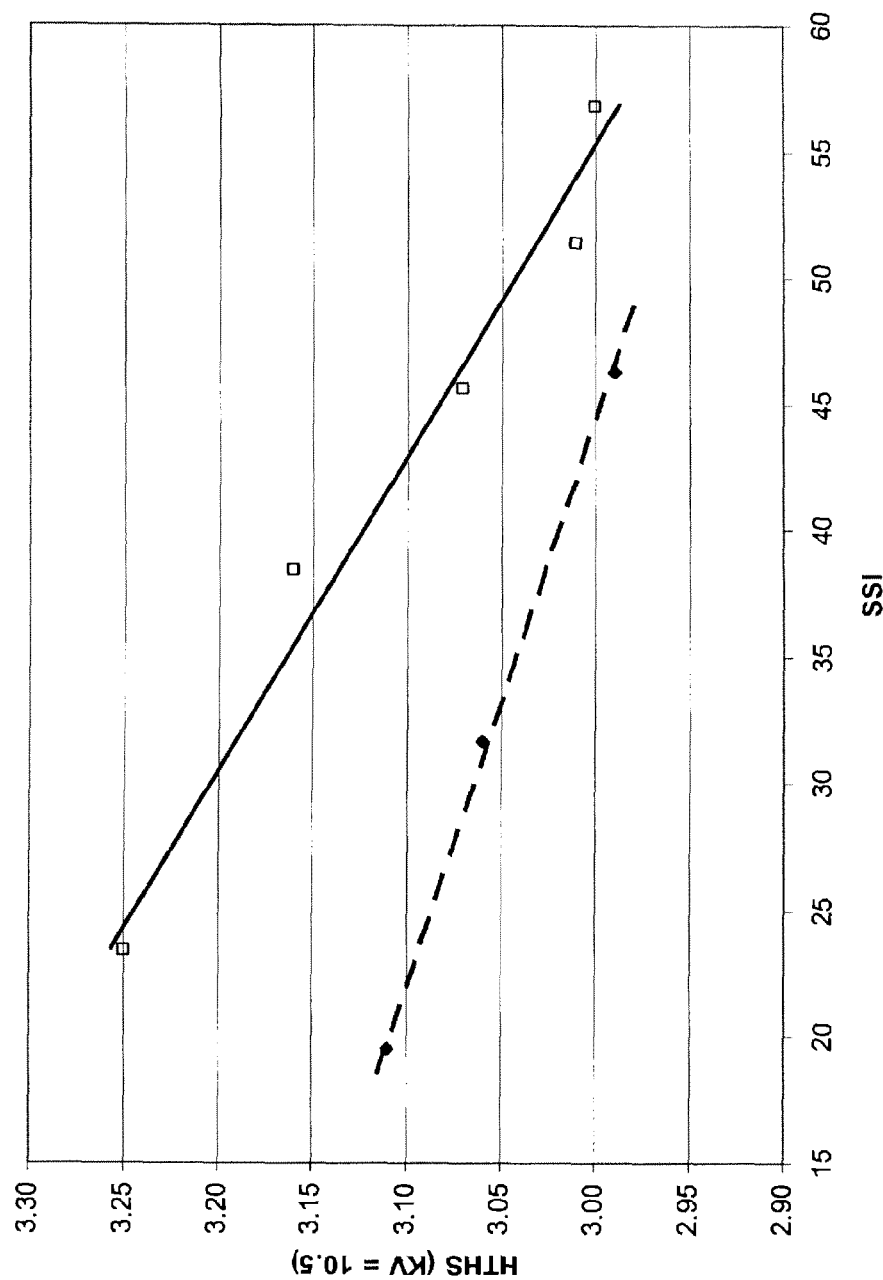
FIG. 1 is a plot of high temperature-high shear viscosity as a function of shear stability index for calculated formulations having a constant KV100 of 10.5.

In the following, the present invention will be specifically explained.
[Viscosity Modifier for Lubricating Oils]

The viscosity modifier for lubricating oils of the present invention comprises a propylene copolymer (A) having a density of 875 kg/m$^3$ or less, wherein the propylene copolymer (A) comprises 60 mole % or more of structural unit derived from propylene (i.e., units derived from propylene monomer) with the proviso that the total of all structural units is 100 mole %.

Copolymers having a large amount of structural units derived from ethylene, such as ethylene propylene rubber (EPR), have been used as conventional viscosity modifiers for lubricating oils. However, the present invention uses a propylene copolymer (A) containing a small amount of structural units derived from ethylene as a viscosity modifier for lubricating oils. A lubricating oil composition containing said propylene copolymer (A) has excellent low-temperature properties such as low-temperature storage property and low-temperature viscosity, and excellent fuel efficiency at high temperatures.

The density of the propylene copolymer (A) is 875 kg/m$^3$ or less, typically in the range of 853 to 875 kg/m$^3$, such as in the range of 853 to 870 kg/m$^3$. A lubricating oil composition containing the propylene copolymer (A) having a density within the above-mentioned ranges is desirable because it has excellent low-temperature storage property and low-temperature viscosity.

The propylene copolymer (A) is a copolymer comprising at least a structural unit derived from propylene, and preferably the propylene copolymer (A) further comprises a structural unit derived from propylene and a structural unit derived from at least one kind of olefin selected from ethylene and α-olefins having 4 to 20 carbon atoms. In one embodiment, the propylene copolymer (A) comprises a structural unit derived from propylene, a structural unit derived from ethylene and a structural unit derived from α-olefin having 4 to 20 carbon atoms.

When the total of structural units is 100 mole % as described above, the propylene copolymer (A) comprises 60 mole % or more of structural units derived from propylene. In one embodiment, the propylene copolymer (A) comprises 60 to 90 mole % of structural units derived from propylene and 10 to 40 mole % of structural units derived from at least one kind of olefin selected from ethylene and α-olefin having 4 to 20 carbon atoms. In another embodiment, the propylene copolymer (A) comprises 60 to 85 mole % of structural units derived from propylene, 5 to 20 mole % of structural units derived from ethylene and 5 to 30 moles % of structural units derived from an α-olefin having 4 to 20 carbon atoms. A lubricating oil composition comprising the propylene copolymer (A) containing structural units derived from each monomer within the above-mentioned range is desirable because it provides excellent fuel efficiency at high temperatures, low-temperature storage property and low-temperature viscosity.

Examples of the α-olefin having 4 to 20 carbon atoms are 1-butene, 1-pentene, 1-hexene, 4-methyl-1-pentene, 1-octene, 1-decene, 1-dodecene, 1-tetradecene, 1-hexadecene, 1-octadecene, 1-eicosene and the like. The α-olefins having 4 to 10 carbon atoms are often used. Particularly, 1-butene is often used. These α-olefins having 4 to 20 carbon atoms may be used solely or in combination of two or more kinds thereof.

In one embodiment, the propylene copolymer (A) exhibits a melting point (Tm 1) of 30° C. to 80° C. when measured by:
(a1) preparing a sheet with a thickness of 2 mm, which sheet is obtained by preheating the propylene copolymer (A) for 5 minutes and pressing the propylene copolymer (A) for 2 minutes using a hot press molding machine set at 190° C., and cooling the pressed propylene copolymer (A) for 4 minutes in a cooling tank set at 20° C.; storing the pressed sheet at 20° C. for 4 weeks; and subsequently observing the pressed sheet in a differential scanning calorimeter (DSC)

by cooling the sheet to −20° C., maintaining the sheet at −20° C. for 5 minutes and heating the sheet to 200° C. at a rate of 10° C./min.

The requirements instructions of (a1) may also be expressed as follows:

(a1) when the propylene copolymer (A) is preheated for 5 minutes and pressed for 2 minutes using a hot press molding machine set at 190° C. and is thereafter cooled for 4 minutes in a cooling tank set at 20° C. to give a press sheet having a thickness of 2 mm and when the press sheet as a specimen after storage at 20° C. for 4 weeks is cooled to −20° C., held at −20° C. for 5 minutes and heated to 200° C. at an increasing rate of 10° C./min, the differential scanning calorimeter (DSC) curve recorded during the above process shows a melting point (Tm1) in the range of 30° C. to 80° C.

Such specimens may be obtained, for example, under conditions described in the Examples. In the above requirement instructions, the propylene copolymer (A) is preheated at 190° C., the propylene copolymer (A) is pressed, and then the propylene copolymer (A) is cooled, and it is preferable that this cooling is conducted immediately after the pressing. Specifically, it is preferable that the pressed propylene copolymer (A) is placed in the cooling tank within 1 minute after the pressing.

When plural fusion peaks are observed in a differential scanning calorimeter (DSC) curve, the highest peak is regarded as a melting point (Tm 1). That the propylene copolymer (A) has a melting point (Tm 1) of 30 to 80° C. means that the propylene copolymer (A) forms microcrystalline components. A lubricating oil composition comprising the propylene copolymer (A) whose melting point (Tm 1) is within the above-mentioned range is desirable because it has excellent low-temperature viscosity.

In one embodiment, the propylene copolymer (A) exhibits a heat of fusion ($\Delta H2$) of 5 J/g or less, preferably 1 J/g or less, when measured by:

(a2) preparing a sheet with a thickness of 2 mm, which sheet is obtained by preheating the propylene copolymer (A) for 5 minutes and pressing the propylene copolymer (A) for 2 minutes using a hot press molding machine set at 190° C., and cooling the pressed propylene copolymer (A) for 4 minutes in a cooling tank set at 20° C.; storing the pressed sheet at 20° C. for 4 weeks; and subsequently observing the pressed sheet in a differential scanning calorimeter (DSC) by cooling the sheet to −20° C., maintaining the sheet at −20° C. for 5 minutes, heating the sheet to 200° C. at a rate of 10° C./min, maintaining the sheet at 200° C. for 5 minutes, cooling the sheet to −100° C. at a rate of 10° C./min, storing the sheet at −100° C. for 5 minutes, and heating the sheet to 200° C. at a rate of 10° C./min, measuring the heat of fusion ($\Delta H2$) on said subsequent heating.

The requirements of (a2) may also be expressed as follows:

(a2) when the propylene copolymer (A) is preheated for 5 minutes and pressed for 2 minutes using a hot press molding machine set at 190° C. and is thereafter cooled for 4 minutes in a cooling tank set at 20° C. to give a press sheet having a thickness of 2 mm and when the press sheet as a specimen after storage at 20° C. for 4 weeks is cooled to −20° C., held at −20° C. for 5 minutes, heated to 200° C. at an increasing rate of 10° C./min, held at 200° C. for 5 minutes, cooled to −100° C. at a decreasing rate of 10° C./min, held at −100° C. for 5 minutes and heated to 200° C. at an increasing rate of 10° C./min, the differential scanning calorimeter (DSC) curve recorded during the above process shows that the heat of fusion ($\Delta H2$) observed in the second heating process is not more than 5 J/g.

A lubricating oil composition comprising the propylene copolymer (A) whose heat of fusion ($\Delta H2$) is within the above-mentioned range is desirable because it has excellent low-temperature storage property.

The reason why a lubricating oil composition containing the propylene copolymer (A) has excellent low-temperature properties is unknown. However, the present inventors infer that in a lubricating oil composition at low temperature, an aggregate of the propylene copolymer (A) is crystallized and reduces flow volume (effective volume), and thereby the lubricating oil composition has excellent low-temperature viscosity. Furthermore, since the aggregate is not precipitated or does not otherwise come out in the lubricating oil composition, the lubricating oil composition also has excellent low-temperature storage property.

The reason why the lubricating oil composition of the present invention has excellent fuel efficiency at high temperatures is unknown. However, the present inventors infer the following matters. It is considered that the propylene copolymer (A) has high solubility in base oil, and the size of the copolymer aggregate is small. When the size of the aggregate is small, viscosity reduction is small under conditions in which a formulation containing the polymer is subjected to high shear, such as between sliding parts. Thus, the temporary viscosity reduction becomes small under such shearing, that is, the polymer exhibits good high temperature, high shear (HTHS) viscosity. Regarding an improvement of fuel efficiency at high-temperature, the minimum viscosity is ensured in order to avoid abrasion at a sliding part. On the other hand, in order to reduce agitation loss at a non-sliding part, lowering the viscosity as much as possible is desirable. In other words, it is desirable that the dependence of viscosity on shear rate is small. In view of these matters, the present inventors infer that the propylene copolymer (A) used in the present invention has excellent fuel efficiency at a high temperature.

The weight average molecular weight of said propylene copolymer (A) measured by a gel permeation chromatography (GPC) may be 10,000 to 500,000, and in one embodiment 30,000 to 400,000, and in another embodiment 50,000 to 350,000. Furthermore, the weight average molecular weight may be 190,000 or less, because more excellent fuel efficiency at a high temperature is exhibited. The term, weight average molecular weight, refers to a weight average molecular weight in terms of polystyrene measured by GPC.

The propylene copolymer (A) whose weight average molecular weight is within the above-mentioned range provides excellent fuel efficiency at high temperatures, and a lubricating oil composition having excellent shear stability can be obtained.

The molecular weight distribution (Mw/Mn, in terms of polystyrene, Mw: weight average molecular weight, Mn: number average molecular weight) of the propylene copolymer (A) measured by GPC may be 4.0 or less, such as 3.0 or less, or 2.5 or less.

The triad tacticity (mm fraction (%)) of the propylene copolymer (A) measured by $^{13}$C-NMR may be 85% or more, or in one embodiment in the range of 85 to 97.5%, and in another embodiment 87 to 97% and in yet another embodiment 90 to 97%. The triad tacticity (mm fraction (%)) is described in and can be measured by a method described in International Publication WO 2004-087775 (page 21, line 7-page 26, line 6). In order to obtain a propylene copolymer (A) having high triad tacticity, in general, it is desirable that the polymerization temperature is low, the polymerization pressure is high and the polymer concentration is low.

Regarding the method for producing the propylene copolymer (A), although it is not particularly limited, the propylene copolymer (A) may be obtained by copolymerizing propylene, ethylene, butene-1 and the like in the presence of known catalysts which can conduct stereoregular polymerization of olefins into isotactic configuration or syndiotactic configuration (for example, a catalyst whose principle components are a titanium component in solid form and an organic metal compound or a metallocene catalyst in which a metallocene compound is used as a component of the catalyst). In particular, a production method which uses a metallocene catalyst which can conduct stereoregular polymerization in isotactic configuration is desirable in order to obtain a lubricating oil composition having excellent fuel efficiency at a high temperature. Examples of such metallocene catalysts include those described in International Publication WO 2004/106430, International Publication WO 2005/019283, International Publication WO 2006/025540 and International Publication WO 2004/087775 (Claims 6-8).

Specifically, as metallocene compounds, there may be mentioned diphenylmethylene(3-tert-butyl-5-ethylcyclopentadienyl)(2,7-di-tert-butylfluorenyl)zirconium dichloride, diphenylmethylene(3-tert-butyl-5-methylcyclopentadienyl)(2,7-di-tert-butylfluorenyl)zirconium dichloride, dimethylmethylene(3-tert-butyl-5-methylcyclopentadienyl)(fluorenyl)zirconium dichloride, and the like.

[Additive Composition for Lubricating Oils]

The additive composition for lubricating oils of the present invention contains 1 to 50 wt % of the above-mentioned propylene copolymer (A) and 50 to 99 wt % of oil (B) with the proviso that the weight % of said (A) and (B) are calculated based on the total amount of (A) and (B) in the additive composition.

In other words, the amounts of the above-mentioned (A) and (B) are amounts based on the total of the above-mentioned (A) and (B) being 100 wt %, although other components may also be present.

As a propylene copolymer (A) which is contained in the additive composition for lubricating oils, the propylene copolymer (A) which is the above-mentioned viscosity modifier for lubricating oils is used. The oils (B) contained in the additive composition for lubricating oils include mineral oils; and synthetic oils such as poly-α-olefin, diesters, polyalkylene glycol and the like.

Mineral oils or blends of mineral oils and synthetic oils may be used. The diesters include polyol ester, dioctyl phthalate, dioctyl sebacate and the like.

Mineral oils subjected to a purification step such as dewaxing or the like are generally used, and have several grades depending on purification procedures. Generally, mineral oils having a wax content of 0.5 to 10% are used. One may also use a highly purified oil which is produced, for example, by hydro-cracking purification and has a low pour point, a high viscosity index, and a composition mainly composed of isoparaffin. Mineral oils having a kinematic viscosity at 40° C. of 10 to 200 cSt are generally used.

Mineral oils are generally used after a purification step such as dewaxing or the like as described above, have several grades depending on purification procedures, and are classified into several grades which are defined by API (American Petroleum Institute) classification. The properties of lubricating oil bases classified into each of the groups are shown in Table 1.

TABLE 1

| Group | Kind | Viscosity index *1 | Saturated hydrocarbon content (% by volume) *2 | sulfur content (% by weight) *3 |
|---|---|---|---|---|
| (i) | Mineral oil | 80-120 | <90 | >0.03 |
| (ii) | Mineral oil | 80-120 | ≥90 | ≤0.03 |
| (iii) | Mineral oil | ≥120 | ≥90 | ≤0.03 |
| (iv) | | | poly-α-olefin | |
| (v) | | lubricating oil base other than the above | | |

*1: Measured in accordance with ASTM D445 (JIS K2283)
*2: Measured in accordance with ASTM D3238
*3: Measured in accordance with ASTM D4294 (JIS K2541)

Poly-α-olefin in Table 1 is a hydrocarbon polymer which is obtained by polymerizing at least an α-olefin having 10 or more carbon atoms as a raw material monomer, and polydecene obtained by polymerizing 1-decene is mentioned as an example.

The oil (B) used in the present invention may be an oil belonging to any of groups (i) to (iv). Particularly suitable is a mineral oil having a kinematic viscosity at 100° C. of 1 to 50 $mm^2/s$ and a viscosity index of 80 or more, or poly-α-olefin. Furthermore, mineral oils belonging to group (ii) or group (iii) or poly-α-olefin belonging to group (iv) are suitable as the oil (B). Oils belonging to group (ii) or group (iii) tend to have a lower wax content as compared with oils belonging to group (i). Particularly, a suitable oil as the oil (B) is a mineral oil which belongs to group (ii) or group (iii) and has a kinematic viscosity at 100° C. of 1 to 50 $mm^2/s$ and a viscosity index of 80 or more, or poly-α-olefin belonging to group (iv).

The additive composition for lubricating oils of the present invention containing the above-mentioned propylene copolymer (A) and oil (B), generally contains 1 to 50 wt % of the above-mentioned propylene copolymer (A) and 50 to 99 wt % of the oil (B) with the proviso that the weight % of said (A) and (B) are calculated based on the total amount of (A) and (B) in the additive composition. The additive composition for lubricating oils of the present invention may contain 2 to 40 wt % of the above-mentioned propylene copolymer (A) and 60 to 98 wt % of the oil (B), such as 3 to 30 wt % of the above-mentioned propylene copolymer (A) and 70 to 97 wt % of the oil (B).

Moreover, in addition to the above-mentioned propylene copolymer (A) and oil (B), the additive composition for lubricating oils of the present invention may contain other components. The other components may optionally include any one or more of the following materials.

One such additive is a detergent. Most conventional detergents used in the field of engine lubrication provide basicity or TBN to the lubricant, due to the presence of basic metal compounds (metal hydroxides, oxides, or carbonates, typically based on such metals as calcium, magnesium, or sodium). Such metallic overbased detergents, also referred to as overbased or superbased salts, are generally single phase, homogeneous Newtonian systems characterized by a metal content in excess of that which would be present for neutralization according to the stoichiometry of the metal and the particular acidic organic compound reacted with the metal. The overbased materials are typically prepared by reacting an acidic material (typically an inorganic acid or lower carboxylic acid such as carbon dioxide) with a mixture of an acidic organic compound (also referred to as a substrate) and a stoichiometric excess of a metal base, typically in a reaction medium of an inert, organic solvent (e.g., mineral oil, naphtha, toluene, xylene) for the acidic organic substrate. Optionally a small amount of promoter such as a phenol or alcohol is present. The acidic organic substrate will normally have a sufficient number of carbon atoms to provide a degree of solubility in oil.

Such conventional overbased materials and their methods of preparation are well known to those skilled in the art. Patents describing techniques for making basic metallic salts of sulfonic acids, carboxylic acids, phenols, phosphonic acids, and mixtures of any two or more of these include U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109. Salixarate detergents are described in U.S. Pat. No. 6,200,936 and PCT Publication WO 01/56968. Saligenin detergents are described in U.S. Pat. No. 6,310,009.

Typical amounts of detergents in a crankcase lubricant may be 1 to 10 weight percent, or 1.5 to 9.0 percent, or 2.0 to 8.0 percent, all expressed on an oil-free basis (that is, without the diluent oil in which they are conventionally supplied).

Another additive is a dispersant. Dispersants are well known in the field of lubricants and include primarily what is known as ashless-type dispersants and polymeric dispersants. Ashless type dispersants are characterized by a polar group attached to a relatively high molecular weight hydrocarbon chain. Typical ashless dispersants include nitrogen-containing dispersants such as N-substituted long chain alkenyl succinimides, also known as succinimide dispersants. Succinimide dispersants are more fully described in U.S. Pat. Nos. 4,234,435 and 3,172,892. Another class of ashless dispersant is high molecular weight esters, prepared by reaction of a hydrocarbyl acylating agent and a polyhydric aliphatic alcohol such as glycerol, pentaerythritol, or sorbitol. Such materials are described in more detail in U.S. Pat. No. 3,381,022. Another class of ashless dispersant is Mannich bases. These are materials which are formed by the condensation of a higher molecular weight, alkyl substituted phenol, an alkylene polyamine, and an aldehyde such as formaldehyde and are described in more detail in U.S. Pat. No. 3,634,515. Other dispersants include polymeric dispersant additives, which are generally hydrocarbon-based polymers which contain polar functionality to impart dispersancy characteristics to the polymer. Dispersants can also be post-treated by reaction with any of a variety of agents. Among these are urea, thiourea, dimercaptothiadiazoles, carbon disulfide, alde-hydes, ketones, carboxylic acids, hydrocarbon-substituted succinic anhydrides, nitriles, epoxides, boron compounds, and phosphorus compounds. References detailing such treatment are listed in U.S. Pat. No. 4,654,403. The amount of dispersant in the present composition can typically be 1 to 10 weight percent, or 1.5 to 9.0 percent, or 2.0 to 8.0 percent, all expressed on an oil-free basis.

Another component is an antioxidant. Antioxidants encompass phenolic antioxidants, which may comprise a butyl substituted phenol containing 2 or 3 t-butyl groups. The para position may also be occupied by a hydrocarbyl group or a group bridging two aromatic rings. The latter antioxidants are described in greater detail in U.S. Pat. No. 6,559,105. Antioxidants also include aromatic amine, such as nonylated diphenylamines. Other antioxidants include sulfurized olefins, titanium compounds, and molybdenum compounds. U.S. Pat. No. 4,285,822, for instance, discloses lubricating oil compositions containing a molybdenum and sulfur containing composition. Typical amounts of antioxidants will, of course, depend on the specific antioxidant and its individual effectiveness, but illustrative total amounts can be 0.01 to 5 percent by weight or 0.15 to 4.5 percent or 0.2 to 4 percent. Additionally, more than one antioxidant may be present, and certain combinations of these can be synergistic in their combined overall effect.

Viscosity improvers in addition to the polymers of the present technology (also sometimes referred to as viscosity index improvers or viscosity modifiers) may be included in the compositions of this invention. Viscosity improvers are usually polymers, including polyisobutenes, polymethacrylic acid esters, diene polymers, polyalkylstyrenes, esterified styrene-maleic anhydride copolymers, alkenylarene-conjugated diene copolymers and polyolefins. Multifunctional viscosity improvers, which also have dispersant and/or antioxidancy properties are known and may optionally be used.

Another additive is an antiwear agent. Examples of antiwear agents include phosphorus-containing antiwear/extreme pressure agents such as metal thiophosphates, phosphoric acid esters and salts thereof, phosphorus-containing carboxylic acids, esters, ethers, and amides; and phosphites. In certain embodiments a phosphorus antiwear agent may be present in an amount to deliver 0.01 to 0.2 or 0.015 to 0.15 or 0.02 to 0.1 or 0.025 to 0.08 percent phosphorus. Often the antiwear agent is a zinc dialkyldithiophosphate (ZDP). For a typical ZDP, which may contain 11 percent P (calculated on an oil free basis), suitable amounts may include 0.09 to 0.82 percent. Non-phosphorus-containing anti-wear agents include borate esters (including borated epoxides), dithiocarbamate compounds, molybdenum-containing compounds, and sulfurized olefins.

Other additives that may optionally be used in lubricating oils include pour point depressing agents, extreme pressure agents, anti-wear agents, friction modifiers, color stabilizers, and anti-foam agents, each of which may be used in their conventional amounts.

It is preferable that the additive composition for lubricating oils of the present invention contains the propylene copolymer (A) and oil (B) in the above-mentioned ranges. When a lubricating oil composition is produced using the additive composition for lubricating oils which contains the propylene copolymer (A) and oil (B) in the above-mentioned range, mixing the additive composition for lubricating oils and other components of the lubricating oil composition can provide a lubricating oil composition having excellent low-temperature properties with a reduced amount of propylene copolymer (A).

Moreover, since the additive composition for lubricating oils of the present invention contains the oil (B), it provides good workability at the time of production of a lubricating oil composition and can be readily mixed with the other components of the lubricating oil composition.

The additive composition for lubricating oils of the present invention can be prepared by mixing the propylene copolymer (A) and the oil (B), as well as, optionally, any other desired components using publicly known conventional methods. Optionally, the copolymer (A) may be provided as a concentrate in oil, for ease in handling.

(Lubricating Oil Composition)

The lubricating oil composition of the present invention contains the above-mentioned propylene copolymer (A) and a lubricating oil base (BB), and may further contain a pour-point depressant (C).

First, each component composing the lubricating oil composition of the present invention is explained.

As propylene copolymer (A) contained in the lubricating oil composition, the above-mentioned propylene copolymer (A) which is a viscosity modifier for lubricating oils is used.

The lubricating oil bases (BB) contained in the lubricating oil composition include mineral oils and synthetic oils such as poly-α-olefin, diesters, polyalkylene glycol and the like.

Mineral oils or blends of mineral oils and synthetic oils may be used. The diesters include polyol ester, dioctyl phthalate, dioctyl sebacate and the like.

Mineral oils subjected to a purification step such as dewaxing or the like are generally used, and have several grades depending on purification procedures. Generally, mineral oils having a wax content of 0.5 to 10% are used. One may also use a highly purified oil which is produced, for example, by hydro-cracking purification and has a low pour point, a high viscosity index, and a composition mainly composed of isoparaffin. Mineral oils having a kinematic viscosity at 40° C. of 10 to 200 cSt are generally used.

Mineral oils are generally used after a purification step such as dewaxing or the like as described above, have several grades depending on purification procedures, and are classified into several grades which are defined by API (American Petroleum Institute) classification. The properties of lubricating oil bases classified into each of the groups are shown in the above-mentioned Table 1.

Poly-α-olefin in Table 1 is a hydrocarbon polymer which is obtained by polymerizing at least an α-olefin having 10 or more carbon atoms as a raw material monomer, and polydecene obtained by polymerizing 1-decene is mentioned as an example.

The lubricating oil base (BB) used in the present invention may be an oil belonging to any of groups (i) to (iv). In one embodiment, the oil is a mineral oil having a kinematic viscosity at 100° C. of 1 to 50 mm$^2$/s and a viscosity index of 80 or more, or poly-α-olefin. Furthermore, mineral oils belonging to group (ii) or group (iii) or poly-α-olefin belonging to group (iv) are suitable as the lubricating oil base (BB). Oils belonging to group (ii) or group (iii) tend to have a lower wax content as compared with oils belonging to group (i).

Particularly, a suitable oil as the lubricating oil base (BB) is a mineral oil which belongs to group (ii) or group (iii) and has a kinematic viscosity at 100° C. of 1 to 50 mm$^2$/s and a viscosity index of 80 or more, or poly-α-olefin belonging to group (iv).

The pour-point depressants (C) which may be contained in the lubricating oil composition include an alkylated naphthalene, a (co)polymer of alkyl methacrylate, a (co)polymer of alkyl acrylate, a copolymer of alkyl fumarate and vinyl acetate, an α-olefin polymer, a copolymer of an α-olefin and styrene, and the like. In particular, a (co)polymer of alkyl methacrylate and a (co)polymer of alkyl acrylate may be used.

As described above, the lubricating oil composition of the present invention contains the propylene copolymer (A) and lubricating oil base (BB), and may further contain the pour-point depressant (C).

In 100 wt % of the lubricating oil composition, the above-mentioned propylene copolymer (A) is generally contained in an amount of 0.1 to 5 wt %, such as in an amount of 0.2 to 4 wt %, or in an amount of 0.4 to 3 wt %, or in an amount of 0.6 to 2 wt %. Furthermore, when the lubricating oil composition of the present invention contains the pour-point depressant (C), in 100 wt % of the lubricating oil composition, the pour-point depressant (C) is generally contained in an amount of 0.05 to 5 wt %, such as in an amount of 0.05 to 3 wt %, or in an amount of 0.05 to 2 wt % or in an amount of 0.05 to 1 wt %.

The components of the lubricating oil composition of the present invention other than the above-mentioned propylene copolymer (A) and the pour-point depressant (C) are the above-mentioned lubricating oil base (BB) and blending components which are described later. The blending components refer to components other than the propylene copolymer (A), lubricating oil base (BB) and pour-point depressant (C) which are contained in the lubricating oil composition.

When the lubricating oil composition of the present invention contains the blending components, there are no particular limitations on the amounts of the blending components, but the amount of the blending component is generally over 0 wt %, such as 1 wt % or more, or 3 wt % or more, or 5 wt % or more with the proviso that the total of the above-mentioned lubricating oil base (BB) and the blending components is 100 wt %. Furthermore, the amount of the blending components is generally 40 wt % or less, for instance, 30 wt % or less, or 20 wt % or less, or 15 wt % or less.

When the amount of said propylene copolymer (A) in the lubricating oil composition of the present invention is within the above-mentioned range, the lubricating oil composition is particularly useful because it has excellent low-temperature storage properties, low-temperature viscosity and fuel efficiency at high temperatures.

For the lubricating oil composition of the present invention, the temperature dependence of viscosity is small, and elevation of pour point is reduced by the interaction between the above-mentioned propylene copolymer (A) and the pour-point depressant (C). This lubricating oil composition is excellent in low-temperature properties at any shear rate, and shows excellent handleability at a low temperature and lubricating performance.

In addition to the above-mentioned propylene copolymer (A), lubricating oil base (BB) and pour-point depressant (C), the lubricating oil composition of the present invention may contain blending components. The blending components include additives having an effect of improving viscosity index such as (co)polymer of alkyl methacrylate, hydrogenated SBR (styrene butadiene rubber), SEBS (styrene-ethylene butylene-styrene block copolymer) and the like, detergents, rust preventives, dispersants, extreme-pressure additives, antifoaming agents, antioxidants, metal deactivators and the like, as described in greater detail above.

The lubricating oil composition of the present invention can be prepared by mixing or dissolving the above-mentioned propylene copolymer (A), lubricating oil base (BB), pour-point depressant (C), and, if necessary, the other blending components using publicly known conventional methods.

The lubricating oil composition of the present invention has excellent low-temperature storage properties, low-temperature viscosity and fuel efficiency at high temperatures. Therefore, the lubricating oil composition of the present invention can be used for lubrication of any of a variety of known mechanical devices, e.g., as engine oils for automobiles, lubricants for heavy duty diesel engines, lubricants for marine diesel engines, lubricants for two-cycle engines, lubricants for automatic transmissions and manual transmissions, gear lubricants, and greases.

EXAMPLES

The present invention will be further described in detail with reference to the examples, but it should be construed that the present invention is in no way limited to those examples.
<Density>
The densities of the copolymers produced or used in the Examples or Comparative Examples are measured according to the method described in ASTM D1505.

<DSC Measurement>
A pressed sheet with a thickness of 2 mm is produced by preheating a copolymer produced in Examples or Comparative Examples for 5 minutes and pressing the copolymer for 2 minutes using a hydraulic hot press molding machine set at 190° C., and cooling the copolymer for 4 minutes in a cooling tank set at 20° C. within 1 minute after the pressing.

This pressed sheet is used as a specimen after a storage thereof at 20° C. for 4 weeks. DSC measurement is conducted using a Differential Scanning Calorimeter (RDC220) (SEIKO) which is calibrated with an indium standard.

About 10 mg of the above-mentioned sample for the measurement is weighed on an aluminum DSC pan. A cover is crimped to the pan, and the sample is left in a closed atmosphere, and thereby a sample pan is obtained.

The sample pan is placed on DSC cell, and an empty aluminum pan is placed as a reference. The DSC cell is cooled from 20° C. (room temperature) to −20° C. under nitrogen atmosphere, then held at −20° C. for 5 minutes, and heated to 200° C. at 10° C./min (1st heating process).

In the second place, the DSC cell is held at 200° C. for 5 minutes and cooled to −100° C. at 10° C./min. The DSC cell is held at −100° C. for 5 minutes, and heated to 200° C. at 10° C./min (2nd heating process).

The fusion peak top temperature of the enthalpy curve obtained from the 1st heating process is regarded as a melting point (Tm 1). If there are two or more fusion peaks, the one having the highest peak is defined as Tm 1.

The fusion peak area of the enthalpy curve obtained from the 2nd heating process is regarded as a heat of fusion (ΔH2).

If there are two or more fusion peaks, the total of peak areas of the two or more peaks is regarded as a heat of fusion (ΔH2) in both cases that the two or more peaks are not completely separated (in other words, the enthalpy curve which connects the peak tops does not return to the base line) and that the two or more peaks are completely separated (in other words, the enthalpy curve which connects peak tops returns to the base line).

Furthermore, when a crystallization peak is observed in addition to the fusion heat peak, the area of the crystallization peak is not added to the calculation.
(Weight Average Molecular Weight and Molecular Weight Distribution)
The weight average molecular weights and molecular weight distributions of the copolymers produced or used in the Examples or Comparative Examples are measured by the following methods.
(Pretreatment of Sample)
30 mg of the copolymer produced or used in the Examples or Comparative Examples is dissolved in 20 ml of o-dichlorobenzene at 145° C., and the solution is filtered by a sintered filter having pore size of 1.0 μm, and thereby a sample for the analysis is obtained.
(GPC Analysis)
The average molecular weight and a molecular weight distribution curve is obtained using gel permeation chromatography (GPC). The calculation is conducted in terms of polystyrene.
(Measurement Apparatus)
Gel permeation chromatograph Alliance GPC 2000 (Waters)
(Analysis Apparatus)
Data processing software Empower 2 (Waters)
(Measurement Conditions)
Columns: two TSK gel GMH$_6$-HT columns and two TSK gel GMH$_6$-HTL columns (each column has diameter 7.5 mm×length 30 cm, TOSO CORPORATION)

Column temperature: 140° C.
Moving Phase: o-dichlorobenzene (containing 0.025% BHT)
Detector: differential refractometer
Flow rate: 1 mL/min
Sample concentration: 0.15%(w/v)
Injected amount: 500 μL
Sampling time interval: 1 second
Column calibration: monodisperse polystyrene (TOSO CORPORATION)
Molecular weight conversion: PS conversion/standard conversion method
[Tacticity (mm)]
The tacticities (mm) of the copolymers produced or used in the Examples or Comparative Examples are obtained by analysis of $^{13}$C-NMR spectrum.
(Measurement Apparatus)
LA 500 Model nuclear magnetic resonance device (JEOL Ltd.)
(Measurement Conditions)
The tacticities (mm) of the copolymers produced or used in the Examples or Comparative Examples are measured in a mixed solvent of orthodichlorobenzene and benzene-d6 (volume ratio: orthodichlorobenzene/benzene-d6=3/1 to 4/1) under the conditions of a temperature of 120° C., a pulse width of 45° pulse, and a pulse repetition time of 5.5 seconds.
[Kinematic Viscosity]
The kinematic viscosities at 100° C. of the lubricating oil compositions prepared in the Examples or Comparative Examples are measured based on ASTM D446.
[High Temperature High Shear (HTHS) Viscosity]
The HTHS viscosities (150° C.) of the lubricating oil compositions prepared in the Examples or Comparative Examples are measured at 150° C./$10^6$ s$^{-1}$ based on ASTM D 4624.

Provided that the lubricating oil compositions have the same kinematic viscosity and almost the same SSI, the higher the HTHS, the more excellent the fuel efficiency at a high temperature.
[Cold Cranking Simulator (CCS) Viscosity]
The CCS viscosities (−30° C.) of the lubricating oil compositions prepared in the Examples or Comparative Examples are measured based on ASTM D 2602. The CCS viscosity is used in evaluating the sliding properties (starting properties) at a crank shaft at a low temperature. Smaller values show better low-temperature viscosity (low-temperature properties) of the lubricating oil.

Provided that the lubricating oil compositions have the same kinematic viscosity and are produced using the copolymers (viscosity modifiers for lubricating oils) having almost the same weight average molecular weight produced or used in the Examples or Comparative Examples, the lower the CCS viscosity, the more excellent the fuel efficiency at low temperature.
[Mini-Rotary (MR) Viscosity]
The MR viscosities (−35° C.) of the lubricating oil compositions prepared in the Examples or Comparative Examples are measured based on ASTM D 3829 and D 4648. The MR viscosity is used in evaluating pumping properties of an oil pump at a low temperature. Smaller values show better low-temperature properties of the lubricating oil.
[Shear Stability Index (SSI)]
The SSIs of the lubricating oil compositions prepared in the Examples or Comparative Examples are measured based on ASTM D 3945. The SSI is a scale of loss of the kinematic viscosity owing to breakage of molecular chains which is caused when the copolymer components in the lubricating oil suffer shearing force in sliding. Larger SSI values show greater loss of the kinematic viscosity.

[Low Temperature Storage Stability Test, Evaluation of Insolubles]

The low-temperature storage properties of the copolymers are evaluated by incorporating the copolymers into a synthetic engine oil formulation which has previously been found to promote gelation with copolymers which are marginally soluble. The synthetic oil formulation used is as follows:

| | | |
|---|---|---|
| API Group IV Oil (PAO) | 81.1 | |
| Additive* | 17.3 | |
| Pour Point Depressant (a polymethacrylate) | 0.2 | |
| Copolymer to be evaluated | 1.4 | |
| | 100.0% by weight | |

*Additive = a conventional engine lubricant package including 14.2 parts of a commercial package (including overbased Ca detergents, N-containing dispersants, antioxidants, anti-wear agent, friction modifier, zinc dialkyldithiophosphate, and antifoam agent) + 3.1 parts of a detergent booster.

The test involves subjecting the engine oil to a four-week cold storage cycle with temperatures alternating from −18 to 0° C. This temperature cycling has been found to promote rapid nucleation and growth of crystals that exacerbate the gelation process.

All the copolymers in Examples 1 through 5 and CE1 through CE4 (identified in greater detail below) are evaluated using this method. The engine oil is observed at the end of each week during the four-week cycle and the results for each week are indicated with the designation AA or BB.

AA . . . (no gelation and/or no insolubles)

BB . . . (gelation and/or insolubles)

These results are summarized in Table 6 for each of the copolymers. The worst results for any of the four weeks in the test are shown.

Example 1

To one of the feed openings of a 310 L volume pressurized continuous polymerization reactor equipped with a stirring blade and thoroughly purged with nitrogen, purified and dehydrated n-hexane is continuously introduced at a flow rate of 27.0 L/hr, and a hexane solution, in which methylaluminoxane (TMAO-341: TOSO FINECHEM CORPORATION) at a concentration of 37.5 mmol/L, diphenylmethylene(3-tert-butyl-5-ethylcyclopentadienyl)(2,7-di-tert-butylfluorenyl)zirconium dichloride at a concentration of 0.15 mmol/L and triisobutylaluminum (TiBA: TOSO FINECHEM CORPORATION) at a concentration of 15.0 mmol/L are mixed, is continuously introduced at a flow rate of 0.2 L/hr (Total: 27.2 L/hr). At the same time, to another feed opening of the continuous polymerization reactor, ethylene at a flow rate of 0.8 kg/hr, propylene at a flow rate of 10.1 kg/hr, butene-1 at a flow rate of 7.0 kg/hr, and hydrogen at a flow rate of 0.5 NL/hr (NL=normal liters, that is, liters at 1 atmosphere and 0° C.) are continuously provided. Then, continuous solution polymerization is conducted under conditions wherein the polymerization temperature is 60° C., the total pressure is 0.8 MPa-G (G=gauge pressure), and the stirring rotation frequency is 190 rpm. Coolants are circulated through jackets equipped outside of the polymerization reactor. Also, the vapor phase is forcibly circulated using a gas blower which is separately equipped, the vapor phase is cooled by a heat exchanger, and thereby polymerization heat is removed.

The hexane solution comprising an ethylene/propylene/butene-1 copolymer which is produced by performing polymerization under the above-mentioned conditions is continuously withdrawn at a rate of 7.2 kg/hr in terms of the ethylene/propylene/butene-1 copolymer through an outlet equipped at the bottom of the polymerization reactor so that the average of solution amount in the polymerization reactor is kept at 100 L. The resultant polymerization solution is poured into a large amount of methanol so as to precipitate the ethylene/propylene/butene-1 copolymer. Then, the ethylene/propylene/butene-1 copolymer is dried under reduced pressure at 130° C. for 24 hours. The properties of the resulting polymer are shown in Table 2.

Example 2

Example 1 is repeated, except that the concentration of methylaluminoxane (TMAO-341: TOSO FINECHEM CORPORATION) is 30.0 mmol/L, the concentration of diphenylmethylene(3-tert-butyl-5-ethylcyclopentadienyl)(2,7-di-tert-butylfluorenyl)zirconium dichloride is 0.12 mmol/L and the concentration of triisobutylaluminum (TiBA: TOSO FINECHEM CORPORATION) is 12.0 mmol/L. The flow rate of ethylene is 0.3 kg/hr, the flow rate of propylene is 10.3 kg/hr, the flow rate of butene-1 is 7.4 kg/hr, and the flow rate of hydrogen is 0.1 NL/hr. The polymerization temperature is 60° C. and the total pressure is 1.0 MPa-G. The polymer is withdrawn at a rate of 4.9 kg/hr. The properties of the resulting polymer are shown in Table 2.

Example 3

Example 1 is repeated, except that the concentration of methylaluminoxane (TMAO-341: TOSO FINECHEM CORPORATION) is 37.5 mmol/L, the concentration of diphenylmethylene(3-tert-butyl-5-ethylcyclopentadienyl)(2,7-di-tert-butylfluorenyl)zirconium dichloride is 0.15 mmol/L and the concentration of triisobutylaluminum (TiBA: TOSO FINECHEM CORPORATION) is 15.0 mmol/L. The total flow rate of these components is 0.1 L/hr, and the flow rate of the hexane is 27.1 L/hr. The flow rate of ethylene is 0.4 kg/hr, the flow rate of propylene is 10.2 kg/hr, the flow rate of butene-1 is 7.0 kg/hr, and the flow rate of hydrogen is 2.2 NL/hr. The polymerization temperature is 60° C. and the total pressure is 1.0 MPa-G. The polymer is withdrawn at a rate of 6.0 kg/hr. The properties of the resulting polymer are shown in Table 2.

Example 4

Example 1 is repeated, except that the concentration of methylaluminoxane (TMAO-341: TOSO FINECHEM CORPORATION) is 37.5 mmol/L, the concentration of diphenylmethylene(3-tert-butyl-5-ethylcyclopentadienyl)(2,7-di-tert-butylfluorenyl)zirconium dichloride is 0.15 mmol/L and the concentration of triisobutylaluminum (TiBA: TOSO FINECHEM CORPORATION) is 15.0 mmol/L. The total flow rate of these components is 0.1 L/hr, and the flow rate of the hexane is 27.1 L/hr. The flow rate of ethylene is 0.4 kg/hr, the flow rate of propylene is 10.3 kg/hr, the flow rate of butene-1 is 7.4 kg/hr, and the flow rate of hydrogen is 1.1 NL/hr. The polymerization temperature is 60° C. and the total pressure is 1.0 MPa-G. The polymer is withdrawn at a rate of 5.5 kg/hr. The properties of the resulting polymer are shown in Table 2.

Example 5

Example 1 is repeated, except that the concentration of methylaluminoxane (TMAO-341: TOSO FINECHEM COR- PORATION) is 37.5 mmol/L, the concentration of diphenyl-methylene(3-tert-butyl-5-ethylcyclopentadienyl)(2,7-di-tert-butylfluorenyl)zirconium dichloride is 0.15 mmol/L and the concentration of triisobutylaluminum (TiBA: TOSO FINECHEM CORPORATION) is 15.0 mmol/L. The total flow rate of these components is 0.1 L/hr, and the flow rate of the hexane is 27.1 L/hr. The flow rate of ethylene is 0.8 kg/hr, the flow rate of propylene is 11.1 kg/hr, the flow rate of butene-1 is 6.5 kg/hr, and the flow rate of hydrogen is 4.5 NL/hr. The polymerization temperature is 60° C. and the total pressure is 1.0 MPa-G. The polymer is withdrawn at a rate of 7.5 kg/hr. The properties of the resulting polymer are shown in Table 2.

Comparative Example 1

Example 1 is repeated, except that the concentration of methylaluminoxane (TMAO-341: TOSO FINECHEM CORPORATION) is 30.0 mmol/L, the concentration of diphenyl-methylene(3-tert-butyl-5-ethylcyclopentadienyl)(2,7-di-tert-butylfluorenyl)zirconium dichloride is 0.12 mmol/L and the concentration of triisobutylaluminum (TiBA: TOSO FINECHEM CORPORATION) is 12.0 mmol/L. The flow rate of ethylene is 0.2 kg/hr, the flow rate of propylene is 10.3 kg/hr, the flow rate of butene-1 is 7.2 kg/hr, and the flow rate of hydrogen is 11.6 NL/hr. The polymerization temperature is 60° C. and the total pressure is 1.0 MPa-G. The polymer is withdrawn at a rate of 4.2 kg/hr. The properties of the resulting polymer are shown in Table 2.

Comparative Example 2

An ethylene/propylene copolymer is obtained according to the method of Polymerization Example 6 which is described in International Publication WO 2000/60032. The properties of the resulting polymer are shown in Table 2.

Comparative Example 3

An ethylene/propylene copolymer is obtained in a similar manner to the method of Comparative Example 2 except that the quantity of hydrogen for preparing is changed from 90 ml to 150 ml and that the polymerization time is changed from 5 minutes to 4 minutes. The properties of the resulting polymer are shown in Table 2.

Comparative Example 4

An ethylene/propylene copolymer is obtained in a similar manner to the method of Comparative Example 2 except that the quantity of hydrogen for preparing is changed from 90 ml to 200 ml and that the polymerization time is changed from 5 minutes to 4 minutes. The properties of the resulting polymer are shown in Table 2.

TABLE 2

| | | Unit | Ex 1 | Ex 2 | Ex 3 | Ex 4 | Ex 5 |
|---|---|---|---|---|---|---|---|
| Composition | C3 | mol % | 65 | 69 | 68.4 | 69 | 68 |
| | C4 | mol % | 23 | 23 | 21.4 | 22.9 | 23.3 |
| | C2 | mol % | 12 | 8 | 10.2 | 8.1 | 8.7 |
| Density | | kg/m$^3$ | 855 | 869 | 865 | 868 | 865 |
| Tm 1 | | °C. | 48 | 44 | 45 | 47 | 47 |
| Δ H2 | | J/g | 0 | 0 | 0 | 0 | 0 |
| Mw (in terms of polystyrene) × 10$^5$ | | | 3.0 | 3.1 | 1.4 | 2.1 | 2.2 |
| Mw/Mn | | | 2.2 | 2.2 | 2.3 | 2.1 | 2.2 |
| Triad tacticity (mm) | | % | — | 92.7 | — | 92.8 | 92.7 |
| Amount of material fed | C2 | kg/hr | 0.8 | 0.3 | 0.4 | 0.4 | 0.8 |
| | C3 | kg/hr | 10.1 | 10.3 | 10.2 | 10.3 | 11.1 |
| | C4 | kg/hr | 7.0 | 7.4 | 7.0 | 7.4 | 6.5 |

| | | Unit | CE 1 | CE 2 | CE 3 | CE 4 |
|---|---|---|---|---|---|---|
| Composition | C3 | mol % | 71.6 | 43 | 48 | 45 |
| | C4 | mol % | 24 | 0 | 0 | 0 |
| | C2 | mol % | 4.4 | 57 | 52 | 55 |
| Density | | kg/m$^3$ | 877 | 852 | 852 | 852 |
| Tm 1 | | °C. | 48 | none | none | none |
| Δ H2 | | J/g | 11 | 0 | 0 | 0 |
| Mw (in terms of polystyrene) × 10$^5$ | | | 3.1 | 2.9 | 2.1 | 1.3 |
| Mw/Mn | | | 2.2 | 2.3 | 2.3 | 2.3 |
| Triad tacticity (mm) | | % | 93.1 | — | — | — |
| Amount of material fed | C2 | kg/hr | 0.2 | — | — | — |
| | C3 | kg/hr | 10.3 | — | — | — |
| | C4 | kg/hr | 7.2 | — | — | — |

— indicates measurement not made or conditions not reported
none = no melting point detected
Ex: Example
CE: Comparative Example Engine oil lubricant formulations are prepared containing the polymers of the present invention and, for comparison, the comparative polymers. Each of the formulations contains the following components:

| | |
|---|---|
| API Group II Base oil | 90.2-91.2 |
| Additive* | 8.15 |
| Pour Point Depressant (polymethacrylate) | 0.15 |
| Copolymer | 0.5-1.5 asindicated in Table 3 |
| Total | 100.0% by weight |

Note:
*Additive = a conventional GF-4 engine lubricant package including 8.0 parts of a commercial package (including Ca and Na overbased detergents, N-containing dispersant, aminic and phenolic antioxidants, zinc dialkyldithiophosphates, sulfurized olefin, friction modifier, and antifoam agent) and 0.15 parts of antioxidant booster.

The copolymers are added as a concentrate in a Group II oil. The solid polymer contents (active chemical basis, absent diluent oil) are shown. The lubricant formulations are subjected to the tests as indicated in Table 3:

TABLE 3

| | Ex 6 | | | | Ex 7 | | | |
|---|---|---|---|---|---|---|---|---|
| | Copolymer: | | | | | | | |
| | Ex 1 | | | | Ex 2 | | | |
| | run | | | | | | | |
| | a | b | c | I* | a | b | c | I* |
| Amount, wt % | 0.54 | 0.68 | 0.81 | 0.78 | 0.54 | 0.68 | 0.81 | 0.75 |
| KV100 (mm$^2$/s) | 8.93 | 9.78 | 10.70 | 10.5 | 9.00 | 10.08 | 10.82 | 10.5 |
| HTHS (150° C., mPa-s) | 2.66 | 2.87 | 3.04 | 3.01 | 2.74 | 2.89 | 3.08 | 3.00 |

TABLE 3-continued

|  | | | | | | | | |
|---|---|---|---|---|---|---|---|---|
| MRV (−35° C., mPa-s) | 26800 | 32600 | 35500 | 35040 | 29400 | 35600 | 43900 | 40460 |
| CCS (−30° C., mPa-s) D6278_30 | 5665 | 5728 | 5895 | 5854 | 5694 | 5571 | 5701 | 5653 |
| KV before | 8.93 | 9.78 | 10.70 |  | 9.00 | 10.08 | 10.82 |  |
| KV after | 7.46 | 7.87 | 8.30 |  | 7.83 | 7.80 | 8.09 |  |
| SSI, % | 51.0 | 51.2 | 51.6 | 51.5 | 54.9 | 56.6 | 57.2 | 56.9 |

|  | Ex 8 | | | | Ex 9 | | | |
|---|---|---|---|---|---|---|---|---|
| Copolymer: | | | | | | | | |
|  | Ex 3 | | | | Ex 4 | | | |
| run | | | | | | | | |
|  | a | b | c | I* | a | b | c | E* |
| Amount, wt % | 1.03 | 1.28 | 1.54 | 1.37 | 0.54 | 0.675 | 0.81 | 1.08 |
| KV100 (mm²/s) | 9.21 | 10.15 | 11.18 | 10.5 | 8.22 | 8.76 | 9.36 | 10.5 |
| HTHS (150° C., mPa-s) | 2.92 | 3.23 | 3.38 | 3.25 | 2.47 | 2.68 | 2.81 | 3.16 |
| MRV (−35° C., mPa-s) | 21900 | 29690 | 32310 | 29640 | 24600 | 26200 | 28600 | 32520 |
| CCS (−30° C., mPa-s) D6278_30 | 5588 | 6248 | 6459 | 6238 | 5521 | 5666 | 5771 | 6028 |
| KV before | 9.21 | 10.15 | 11.18 |  | 8.22 | 8.76 | 9.36 |  |
| KV after | 8.59 | 9.21 | 9.89 |  | 7.44 | 7.76 | 8.13 |  |
| SSI, % | 19.6 | 23.0 | 25.1 | 23.5 | 35.9 | 36.9 | 37.2 | 38.5 |

|  | Ex 10 | | | | CE 5 | | | |
|---|---|---|---|---|---|---|---|---|
| Copolymer: | | | | | | | | |
|  | Ex 5 | | | | CE 1 | | | |
| run | | | | | | | | |
|  | a | b | c | E* | a | b | c | I* |
| Amount, wt % | 0.54 | 0.675 | 0.81 | 1.01 | 0.54 | 0.675 | 0.81 | 0.80 |
| KV100 (mm²/s) | 8.35 | 8.93 | 9.60 | 10.5 | 8.93 | 9.71 | 10.57 | 10.5 |
| HTHS (150° C., mPa-s) | 2.59 | 2.70 | 2.87 | 3.07 | 2.64 | 2.81 | 2.99 | 2.98 |
| MRV (−35° C., mPa-s) | 22300 | 24700 | 28500 | 32830 | 20400 | 22500 | 24100 | 24050 |
| CCS (−30° C., mPa-s) D6278_30 | 5210 | 5495 | 5648 | 5986 | 5332 | 5467 | 5598 | 5589 |
| KV before | 8.35 | 8.93 | 9.60 |  | 8.93 | 9.71 | 10.57 |  |
| KV after | 7.35 | 7.66 | 8.01 |  | 7.39 | 7.44 | 8.15 |  |
| SSI, % | 43.5 | 44.1 | 44.8 | 45.7 | 53.5 | 53.8 | 53.5 | 53.6 |

|  | CE 6 | | | | CE 7 | | | |
|---|---|---|---|---|---|---|---|---|
| Copolymer: | | | | | | | | |
|  | CE 2 | | | | CE 3 | | | |
| run | | | | | | | | |
|  | a | b | c | I* | a | b | c | I* |
| Amount, wt % | 0.66 | 0.78 | 0.90 | 0.83 | 0.81 | 0.95 | 1.09 | 1.00 |
| KV100 (mm²/s) | 9.19 | 10.09 | 11.12 | 10.5 | 9.21 | 10.15 | 11.18 | 10.5 |
| HTHS (150° C., mPa-s) | 2.72 | 2.92 | 3.11 | 2.99 | 2.80 | 2.98 | 3.20 | 3.06 |
| MRV (−35° C., mPa-s) | 25600 | 32400 | 43500 | 37260 | 23700 | 28200 | 31500 | 29060 |
| CCS (−30° C., mPa-s) D6278_30 | 5852 | 5941 | 6013 | 5966 | 5899 | 6103 | 6271 | 6151 |
| KV before | 9.19 | 10.09 | 11.12 |  | 9.21 | 10.15 | 11.18 |  |
| KV after | 7.78 | 8.23 | 8.75 |  | 8.29 | 8.85 | 9.51 |  |
| SSI, % | 45.0 | 46.1 | 46.7 | 46.3 | 29.2 | 31.8 | 32.5 | 31.7 |

TABLE 3-continued

| | CE 8 Copolymer: CE 4 run | | | |
|---|---|---|---|---|
| | a | b | c | I* |
| Amount, wt % | 0.87 | 1.09 | 1.305 | 1.12 |
| KV100 (mm$^2$/s) | 9.34 | 10.32 | 11.40 | 10.5 |
| HTHS (150° C., mPa-s) | 2.87 | 3.05 | 3.32 | 3.11 |
| MRV (−35° C., mPa-s) | 21400 | 24700 | 28900 | 25540 |
| CCS (−30° C., mPa-s) | 6071 | 6319 | 6583 | 6361 |
| D6278_30 | | | | |
| KV before | 9.34 | 10.32 | 11.40 | |
| KV after | 8.77 | 9.56 | 10.21 | |
| SSI, % | 17.2 | 17.9 | 22.3 | 19.5 |

*Values in these columns are interpolated (I) or extrapolated (E) from the results from runs a through c to simulate a formulation with KV100 = 10.50.
KV100 = kinematic viscosity at 100° C.
HTHS = high temperature high shear viscosity
MRV = Mini-Rotary viscosity
CCS = cold crank simulator viscosity
D6278_30 and SSI: shear stability index as determined by ASTM D 6278_30
Ex = Example
CE = Comparative Example The results are summarized in Table 4 below. The values reported are for the interpolated or extrapolated values for the simulated formulations having KV100=10.5.

TABLE 4

| | Ex 6 | Ex 7 | Ex 8 | Ex 9 | Ex 10 | CE 5 | CE 6 | CE 7 | CE 8 |
|---|---|---|---|---|---|---|---|---|---|
| KV100 | 10.5 | 10.5 | 10.5 | 10.5 | 10.5 | 10.5 | 10.5 | 10.5 | 10.5 |
| HTHS | 3.01 | 3.00 | 3.25 | 3.16 | 3.07 | 2.98 | 2.99 | 3.06 | 3.11 |
| SSI | 51.5 | 56.9 | 23.5 | 38.5 | 45.7 | 53.6 | 46.3 | 31.7 | 19.5 |

When comparison is made between the materials, taking into account the SSI, it is recognized that, in general, the Examples will have higher HTHS viscosity than the corresponding Comparative Examples. Example 10, for instance will have higher HTHS viscosity than Comparative Example 6, although both will have similar SSI. Likewise, Example 8 will have higher HTHS than Comparative Example 8, although they will have similar SSI.

This relationship may be more clearly seen in FIG. 1. In this figure the calculated HTHS viscosity of the simulated formulations (that is, at KV 100 set to 10.50) is plotted as a function of SSI, the shear stability index. The upper line (solid line with open square points) represents the materials of the present invention incorporating the polymers having greater than 60 mole % propylene monomer component, Examples 6 through 10. The lower line (dashed line with solid diamond points) represents Comparative Examples 6, 7, and 8, that is, containing polymers having less than 60 mole % propylene monomer component. The superior HTHS viscosities of the materials of Examples 6 through 10 are evident and are believed to persist (for the technology of the present invention, in general) through SSI values at least as high as 60, 65, or 70. The improvement is believed to be even more pronounced at SSI values of 15 to 47 or 15 to 40.

The same data from Examples 6-10 and Comparative Examples 5-8 may be alternatively presented by providing interpolated or extrapolated values for KV100 for simulated formulations in which the HTHS viscosity is set to a constant value of 2.9. The resulting data is presented in Table 5, which is generated in a manner exactly analogous to Table 4.

TABLE 5

| | Ex 6 | Ex 7 | Ex 8 | Ex 9 | Ex 10 | CE 5 | CE 6 | CE 7 | CE 8 |
|---|---|---|---|---|---|---|---|---|---|
| KV100 | 10.00 | 9.95 | 9.05 | 9.59 | 9.76 | 10.14 | 10.05 | 9.72 | 9.54 |
| HTHS | 2.90 | 2.90 | 2.90 | 2.90 | 2.90 | 2.90 | 2.90 | 2.90 | 2.90 |
| SSI | 51.4 | 56.2 | 19.3 | 37.6 | 45.0 | 53.6 | 45.9 | 30.4 | 17.0 |

It is evident that for materials of the same HTHS and similar SSI, the kinematic viscosity at 100° C. will be lower for materials of the present invention. The comparison is presented graphically in FIG. 2. In this figure the calculated HTHS viscosity of the simulated formulations (that is, at HTHS set to 2.90) is plotted as a function of SSI, the shear stability index. The lower line (dashed line with open square points) represents the materials of the present invention incorporating the polymers having greater than 60 mole % propylene monomer component, Examples 6 through 10. The upper line (solid line with solid diamond points) represents Comparative Examples 6, 7, and 8, that is, containing polymers having less than 60 mole % propylene monomer component. The reduced KV100 of the materials of Examples 6 through 10 is evident and is believed to persist (for the technology of the present invention, in general) through SSI values at least as high as 60, 65, or 70. The improvement is believed to be even more pronounced at SSI values of 15 to 47 or 15 to 40.

The above-described improvements permit lubricants of the present invention to be formulated at lower kinematic viscosity while retaining equivalent HTHS, thus providing lubricants with improved fuel economy.

The copolymer used in the present invention, moreover, leads to lubricant compositions having improved low-temperature storage properties compared to that of Comparative Example 1. When each of the polymers of Ex 1 through 5 and CE 1 through 4 is subjected to the low temperature stability test described above, the results are obtained as shown in Table 6, below.

TABLE 6

| | Example | | | | | | | | |
|---|---|---|---|---|---|---|---|---|---|
| | Ex 6 | Ex 7 | Ex 8 | Ex 9 | Ex 10 | CE 5 | CE 6 | CE 7 | CE 8 |
| Polymer | EX 1 | EX 2 | EX 3 | EX 4 | EX 5 | CE 1 | CE 2 | CE 3 | CE 4 |
| Stability | AA | AA | AA | AA | AA | BB | AA | AA | AA |

Each of the polymers except that of CE1 exhibits no gelation or insolubles, referred to as condition "AA". However, the polymer of CE1 exhibits gelation or formation of insolubles, referred to as condition "BB".

What is claimed is:

1. A viscosity modifier for lubricating oils which comprises a propylene copolymer (A) having a density in the range of 853 to 875 kg/m$^3$ and comprising 60 to 85 mole % of structural units derived from propylene, 5 to 20 mole % of structural units derived from ethylene and 5 to 30 mole % of structural units derived from α-olefin having 4 to 20 carbon atoms with the proviso that the total of all structural units is 100 mole %.

2. The viscosity modifier for lubricating oils according to claim 1, wherein the α-olefin comprises butene-1.

3. The viscosity modifier for lubricating oils according to claim 1, wherein the weight average molecular weight of said propylene copolymer (A) is 10,000 to 500,000 as measured by a gel permeation chromatography (GPC).

4. The viscosity modifier for lubricating oils according to claim 1, wherein the propylene copolymer (A) exhibits a melting point (Tm 1) of 30° C. to 80° C. when measured by:
    (a1) preparing a sheet with a thickness of 2 mm, which sheet is obtained by preheating the propylene copolymer (A) for 5 minutes and pressing the propylene copolymer (A) for 2 minutes using a hot press molding machine set at 190° C., and cooling the pressed propylene copolymer (A) for 4 minutes in a cooling tank set at 20° C.; storing the pressed sheet at 20° C. for 4 weeks; and subsequently observing the pressed sheet in a differential scanning calorimeter (DSC) by cooling the sheet to −20° C., maintaining the sheet at −20° C. for 5 minutes and heating the sheet to 200° C. at a rate of 10° C./min.

5. The viscosity modifier for lubricating oils according to claim 1, wherein the propylene copolymer (A) exhibits a heat of fusion (ΔH2) of 5 J/g or less when measured by:
    (a2) preparing a sheet with a thickness of 2 mm, which sheet is obtained by preheating the propylene copolymer (A) for 5 minutes and pressing the propylene copolymer (A) for 2 minutes using a hot press molding machine set at 190° C., and cooling the pressed propylene copolymer (A) for 4 minutes in a cooling tank set at 20° C.; storing the pressed sheet at 20° C. for 4 weeks; and subsequently observing the pressed sheet in a differential scanning calorimeter (DSC) by cooling the sheet to −20° C., maintaining the sheet at −20° C. for 5 minutes, heating the sheet to 200° C. at a rate of 10° C./min, maintaining the sheet at 200° C. for 5 minutes, cooling the sheet to −100° C. at a rate of 10° C./min, storing the sheet at −100° C. for 5 minutes, and heating the sheet to 200° C. at a rate of 10° C./min, measuring the heat of fusion (ΔH2) on said subsequent heating.

6. An additive composition for lubricating oils comprising 1 to 50 wt % of the propylene copolymer (A) according to claim 1 and 50 to 99 wt % of an oil (B) with the proviso that the weight % of said (A) and (B) are calculated based on the total amount of (A) and (B) in the additive composition.

7. A lubricating oil composition comprising the propylene copolymer (A) according to claim 1 and a lubricating oil base (BB), wherein said propylene copolymer (A) is present in an amount of 0.1 to 5 wt % in 100 wt % of the lubricating oil composition.

8. The lubricating oil composition according to claim 7, further comprising 0.05 to 5 wt % of a pour-point depressant (C) in 100 wt % of the lubricating oil composition.

* * * * *